(12) United States Patent
Finkenzeller et al.

(10) Patent No.: US 12,524,749 B1
(45) Date of Patent: Jan. 13, 2026

(54) DETERMINING ITEM COST USING AUTO-GENERATED SENSOR DATA

(71) Applicant: Amazon Technologies, Inc., Seattle, WA (US)

(72) Inventors: Stefan Finkenzeller, Seattle, WA (US); Ramasubramanian Balagurunathan, Seattle, WA (US); Aneeta Bhattacharyya, Seattle, WA (US); Manmeet Bhavsar, Redmond, WA (US); Sanjay Dash, Mercer Island, WA (US); Smita Joshi, Issaquah, WA (US); Siddharth Lathia, Kirkland, WA (US); Shashank Saraogi, Seattle, WA (US); Lokita Yaputra, Seattle, WA (US); Jiongran Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 764 days.

(21) Appl. No.: 15/495,319

(22) Filed: Apr. 24, 2017

(51) Int. Cl.
*G06Q 20/20* (2012.01)
*G06F 16/903* (2019.01)
*G06Q 30/0601* (2023.01)

(52) U.S. Cl.
CPC ....... *G06Q 20/201* (2013.01); *G06Q 30/0633* (2013.01); *G06F 16/903* (2019.01)

(58) Field of Classification Search
CPC ............. G06Q 20/201; G06Q 30/0633; G06Q 20/203; G06Q 30/0223; G06Q 10/08; G06Q 10/087; G06Q 30/0635; G06Q 30/0206; G06Q 30/0283; G06F 16/903; G06F 9/466; G07G 1/0009; G07G 1/0054; G07G 1/0072; G08B 13/2462; G08B 13/1472; Y04S 10/56; Y10S 707/949; Y10S 705/00; Y10S 902/22; Y10S 902/40; H05B 6/6464
USPC .... 705/20, 26.1, 40, 337, 347; 235/383, 381
See application file for complete search history.

(56) References Cited

U.S. PATENT DOCUMENTS

| | | | |
|---|---|---|---|
| 7,178,722 B2 * | 2/2007 | Do | G06Q 20/201 235/378 |
| 7,555,466 B2 * | 6/2009 | Eglen | G06Q 30/0206 705/400 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 2006/0195345 A1 * | 8/2006 | Close | G06Q 10/04 705/20 |
| 2007/0073580 A1 * | 3/2007 | Perry | G06Q 30/02 705/26.1 |
| 2007/0214057 A1 * | 9/2007 | Lee | G06Q 30/0643 705/14.23 |

(Continued)

*Primary Examiner* — Avia Salman
(74) *Attorney, Agent, or Firm* — Athorus, PLLC

(57) ABSTRACT

This disclosure describes techniques for determining an appropriate cost to charge a user for an item in an environment that relies on sensor data rather than traditional checkout methods. For instance, a physical store may include a weight sensor on a shelf to identify a customer picking an item from the shelf Upon the user picking the item, the techniques may determine a first cost of the item. When a camera is used to observe the user exiting the store, triggering automatic payment for the item, the techniques may determine whether the price of the item has changed. If so, then the techniques may charge the user for the lesser of the two prices.

20 Claims, 7 Drawing Sheets

(56) References Cited

U.S. PATENT DOCUMENTS

| | | | | |
|---|---|---|---|---|
| 2007/0271149 | A1* | 11/2007 | Siegel | G06Q 30/0641 |
| | | | | 705/26.41 |
| 2008/0319575 | A1* | 12/2008 | Vahlberg | G06Q 10/087 |
| | | | | 700/232 |
| 2010/0138281 | A1* | 6/2010 | Zhang | G06Q 10/087 |
| | | | | 705/28 |
| 2012/0284105 | A1* | 11/2012 | Li | G06Q 30/02 |
| | | | | 705/14.23 |
| 2013/0284806 | A1* | 10/2013 | Margalit | G06Q 30/06 |
| | | | | 235/382 |
| 2015/0019310 | A1* | 1/2015 | Young | G06Q 30/0223 |
| | | | | 705/14.16 |
| 2015/0029339 | A1* | 1/2015 | Kobres | H04N 7/181 |
| | | | | 348/150 |
| 2015/0106179 | A1* | 4/2015 | Chow | G06Q 30/0215 |
| | | | | 705/14.17 |
| 2015/0227993 | A1* | 8/2015 | Mix | G06Q 30/0601 |
| | | | | 705/26.1 |
| 2015/0241583 | A1* | 8/2015 | Pace | G01V 1/305 |
| | | | | 367/36 |
| 2015/0294377 | A1* | 10/2015 | Chow | G06Q 30/0263 |
| | | | | 705/347 |
| 2015/0339760 | A1* | 11/2015 | Araque | G06Q 30/0633 |
| | | | | 705/26.8 |
| 2016/0019514 | A1* | 1/2016 | Landers, Jr. | G06Q 20/202 |
| | | | | 705/23 |
| 2016/0110703 | A1* | 4/2016 | Herring | G07G 1/0045 |
| | | | | 705/23 |
| 2016/0379297 | A1* | 12/2016 | Aspholm | G06Q 20/3276 |
| | | | | 705/26.8 |
| 2017/0169440 | A1* | 6/2017 | Dey | H04W 4/021 |
| 2018/0096566 | A1* | 4/2018 | Blair, II | G07G 1/0009 |

* cited by examiner

500

RECEIVE SENSOR DATA FROM A SENSOR IN AN ENVIRONMENT
502

ANALYZE THE SENSOR DATA TO DETERMINE THAT A USER HAS PICKED AN ITEM
504

DETERMINE A FIRST PRICE OF THE ITEM AT A FIRST TIME
506

RECEIVE AN UPDATE IN PRICE OF THE ITEM TO A SECOND PRICE
508

RECEIVE ADDITIONAL SENSOR DATA FROM AN ADDITIONAL SENSOR IN AN ENVIRONMENT
510

5B

DETERMINING ITEM COST USING AUTO-GENERATED SENSOR DATA

BACKGROUND

Retailers, wholesalers, and other product distributors typically maintain an inventory of various items that may be ordered, purchased, leased, borrowed, rented, viewed, and so forth, by clients or customers. For instance, physical stores maintain inventory in customer-accessible areas, such as in a shopping area, and customers are able to pick items from inventory and take them to a cashier for purchase, rental, and so forth. Although most physical stores utilize cashiers or dedicated self-checkout stands to finalize transactions with customers, future physical stores may include an array of sensors to allow users to acquire and pay for items without cashiers or dedicated self-checkout stands.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
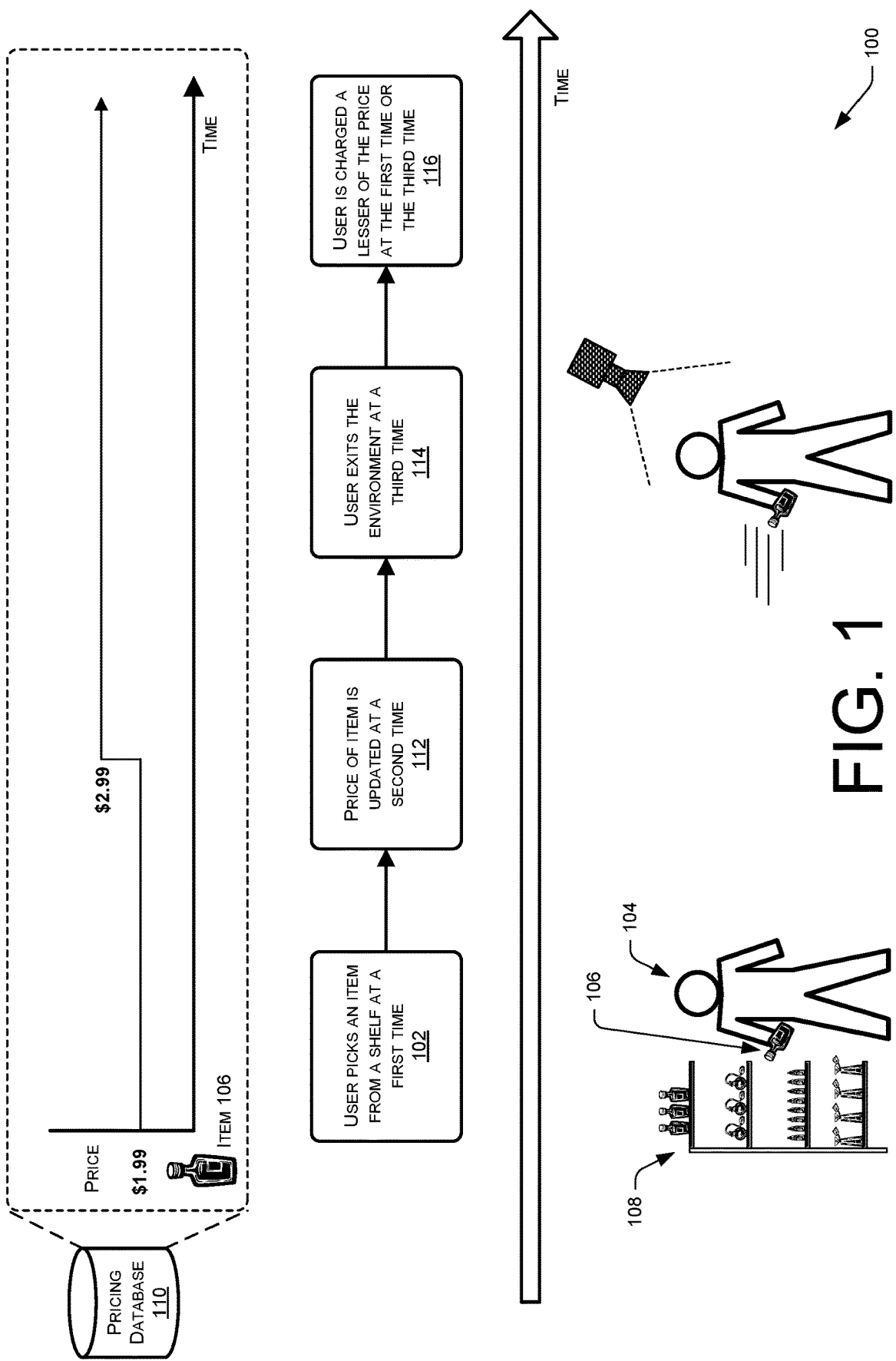
FIG. 1 illustrates an example process where a user a picks an item from a shelf of an environment at a first time and exits the environment at a second time. Given that a price of the picked item may have changed between the first and second times, the techniques described herein determine the lowest price between the first and second times and charge an account of the user the lower price in exchange for the item.

This disclosure describes systems and techniques for detecting events that occur within a materials handling facility (facility) and updating virtual shopping carts of respective users based on the detected events. For instance, the described techniques may utilize sensor data acquired by different sensors residing in the facility to detect different events, such as users entering the facility, users picking items from locations (e.g., shelfs, etc.) in the facility, users returning items to the locations, users exiting the facility, and the like. For example, the techniques may identify, using one or more sensors such as weight sensors, cameras, and the like, when a particular user picks an item from the shelf Upon identifying the respective user that picked the item and identifying the item, the techniques may update a state of a virtual shopping cart of the user to reflect the addition of the identified item. That is, a virtual shopping cart associated with the user may be updated to indicate the addition of the item, as well as a price associated with the item. In some instances, however, the price ultimately charged to an account of the user may represent a lowest price during a particular time range, such as between a time that the user picked the item and a time at which the user exited the facility, as described in detail below.

The facility may have access to an inventory management system that is configured to maintain information about items, users, condition of the facility, and so forth. For example, the inventory management system may maintain data indicative of a result of different events that occur within the facility, such as what items a particular user is ordered to pick, a location of the particular user, availability of a user providing support services to others, requests for assistance, environmental status of the facility, and so forth. Operation of the inventory management system may be supported by sensor data acquired by one or more sensors. The sensor data may include image data acquired by imaging devices such as cameras, information acquired from radio frequency tags, weight sensors, and so forth.

The inventory management system may determine, using the sensor data, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously. When the system described herein detects sensor data indicative of an event, the system may generate an event record that indicates the occurrence of the event.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify an item removed from an inventory location as well as a user that removed the item. In response, the inventory management system may automatically update a virtual shopping cart of that particular user. However, in some situations, it may be advantageous to use human input to generate or confirm the output data. In these situations, inquiry data may be provided to an associate service that provides the inquiry data to one or more devices associated with one or more associates supporting operation of the facility.

As noted above, the system may use sensor data to determine occurrence of an event, such as a user picking an item form a shelf in the facility. The system may use this sensor data to associate a result to an event record associated with this event, such as indication of an item identifier of the item picked, a number of the total items picked, a user that picked the item, etc. Further, the system may calculate a confidence level associated with the determined result. If this confidence level is higher than a threshold confidence level, the system may store a result of the event. If, however, the confidence level is lower than the threshold confidence level, then the system may request input from a human associate. In either instance, a final result may be determined and a virtual shopping cart may be correspondingly updated. For instance, if the inventory management determines with a threshold level of confidence that a particular user picked a particular box of cereal from a shelf of the facility, or if a human associate manually makes that determination, the inventory management system may update the virtual shopping cart of that user to indicate this particular box of cereal.

Therefore, when the user requests to finalize a transaction with a provider of the system (e.g., request to pay for items in the user's shopping cart), the inventory management system may charge a payment instrument of the user for a cost (i.e., price) of all items designated in the virtual shopping cart, including the box of cereal. In some instances, however, a price of an item, such as the example box of cereal, may change between a time at which the user picks the item and a time at which the user pays for the item. The techniques describe below assist in determining the appropriate amount to charge the user in these circumstances. The amount ultimately charged may comprise the lowest price during the time range of the user's shopping experience in many instances, although it other instances it may comprise a blended price (e.g., based on different prices of the item during the time range), a highest price, or the like.

As described above, the inventory management system may charge a user for a lowest cost of an item between two points in time during, before, or after the shopping experience of the user. In some instances, a user may pick an item from a shelf and bring the item to a checkout stand of the merchant, who may utilize a point-of-sale (POS) device to scan the item for checkout. In this example, a first price of the item may be determined at a first time based on the user requesting to pay for the item, as represented by the scanning of the item or item identifier via the POS device. For instance, the first time may comprise the time at which the user requests the pay for the item (i.e., the time of the scan), a first predefined amount of time before or after the scan, or the like. In addition, the inventory management system may determine a second price of the item at a second time, which may be prior to or after the first time. In some instances, the second time is a second predefined amount of time prior to the first time (or prior to the request to provide payment for the item). After determining the time range defined between these two times, the inventory management system may charge the user for a lowest cost either at these times or the lowest cost between these two times.

To provide an example, envision that a user brings a book to a checkout stand for payment. The merchant may use a POS device to scan the item. A lowest price of the book between the time of the scan and a predefined amount of time prior to the scan (e.g., one hour, etc.) may be determined and the user may be changed this lowest price. In another example, the user may be charged the lowest price between a time range between a certain amount of time after the scan (e.g., a half hour after the scan) and a certain amount of time prior to the scan (e.g., an hour prior to the scan).

FIG. 1, for instance, illustrates an example scenario 100 where the price of an item picked by a user changes between the time of picking and the time at which the user pays for the item. As illustrated, an operation 102 shows a user 104 picking an example item 106 from a shelf 108 within an environment at a first time. The environment may represent the materials handling facility described in detail with reference to FIG. 2 or any other environment. In this example, the environment may include an array of sensors to detect the picking of the item 106 from the shelf 108. For instance, the shelf 108 may include one or more weight sensors to detect changes in weight on the shelf 108, such that sensor data indicating a decrease in weight indicates that an item has been removed and an increase in weight indicates that an item has been added. Further, the shelf 108 may include one or more cameras that may acquire images of the shelf 108 to detect when items have been removed. In still other instances, the environment may include one or more overhead cameras to detect the user 104 removing the item 106 from the shelf 108. Of course, while a few examples have been described, it is to be appreciated that sensor data from one or more of an array of sensors may be analyzed to identify the item 106 and the user 104 picking the item.

For instance, in some instances the sensor data used to detect the picking of the item may be generated from a sensor of a device of the user. For instance, the user may use a camera of his or her mobile device to determine an identifier of the item (e.g., via a scan, capturing an image and performing OCR, etc.). An application executing on the mobile device of the user 104 may then send an indication of the item identifier to one or more computing devices for determining the identity of the item and the time at which the user 104 picked the item. In another example, the mobile device may identify the item and the time of the pick based on the sensor data.

FIG. 1 further illustrates that a pricing database 110 in the environment may maintain the prices of different items in the environment. For instance, the pricing database 110 stores an indication that at the time at of the operation 110, the price of the item 106 was $1.99. An operation 112, meanwhile, represents that at a second time, after the user 104 has picked the item 106, the price of the item 106 is updated. That is, the pricing database 110 is updated to reflect that the item 106 now costs $2.99 as opposed to $1.99. In this example, however, the user 104 has yet to exit the environment and, thus, has yet to pay for the item 106.

An operation 114 represents the user 104 exiting the environment with the item 106 after the price of the item 106 was increased to $2.99. In this example, one or more sensors in the facility are utilized to detect the user leaving the environment, with this detection resulting in an account of the user 104 being charged for a cost to a user (i.e., price or sales price) of any items acquired by the user 104, such as the example item 106. For instance, an overhead camera may be positioned near an exit of the facility to identify when the user 104 leaves the environment. In addition or in the alternative, the entry and/or exit to the facility may include a gate with a turnstile or the like that, when triggered, instructs the camera to acquire images of the entry/exit point. In another instances, the exit and/or entry gate may include a scanner that allows a user to scan some sort of identification (e.g., a barcode or the like displayed on application of the user's mobile device) that uniquely identifies the user.

Upon detecting the user 104 exiting the environment, an operation 116 represents the a payment instrument or other account of a user being charged for the cost of any items. In this example, the system determines the lesser price between the price of the item 106 at the time the user 104 picked the item from the shelf 108 and the price of the item 106 at the time at which the user 104 exited the environment. In this example, the system thus charges the user $1.99 rather than the current price of the item ($2.99).

As will be appreciated, the techniques thus define a time range associated with a shopping experience of a user for the purpose of determining the appropriate prices to charge the user for items picked by the user during the shopping experience, should the cost of one or more of the items change during that time. In one example, the techniques define a time range between a first time ($T_1$) and a second time ($T_2$) and charge a user for a lowest price of an item between $T_1$ and $T_2$ (or a lowest price at those two points in time in some instances). In the example of FIG. 1, for instance, $T_1$ is defined as a time of the user picking the item 106, while $T_2$ is defined as the time at which the user 104 is detected as leaving the store. Therefore, given that the lowest price for the item 106 during that time range was $1.99, the user account is charged $1.99 in this example, Of course, other implementations may define $T_1$ and $T_2$ in other ways. For instance, $T_1$ may comprise a time at which the user 104 enters the environment (e.g., the physical store), a predefined amount of time prior to the user 104 entering the store (e.g., 30 minutes, one day, etc.), a predefined amount of time prior to the user 106 picking the item 106 (e.g., five minutes, 30 minutes, etc.), or the like. Similarly, $T_2$ may comprise a time at which the user exits the facility, a predefined amount of time after user 104 exits the facility (e.g., 30 minutes, one day, etc.), a time at which a point-of-sale (POS) device scans an identifier of the item and requests payment from the user 104, or the like. Regardless of the exact time range used, in some instances the techniques described herein charge a user for a lowest price between a defined time range, so as to avoid the scenario where the user 104 relies incorrectly upon a lower price than the price actually charged to the user's account.

The techniques described herein may apply in an array of environments and may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Figure 2:
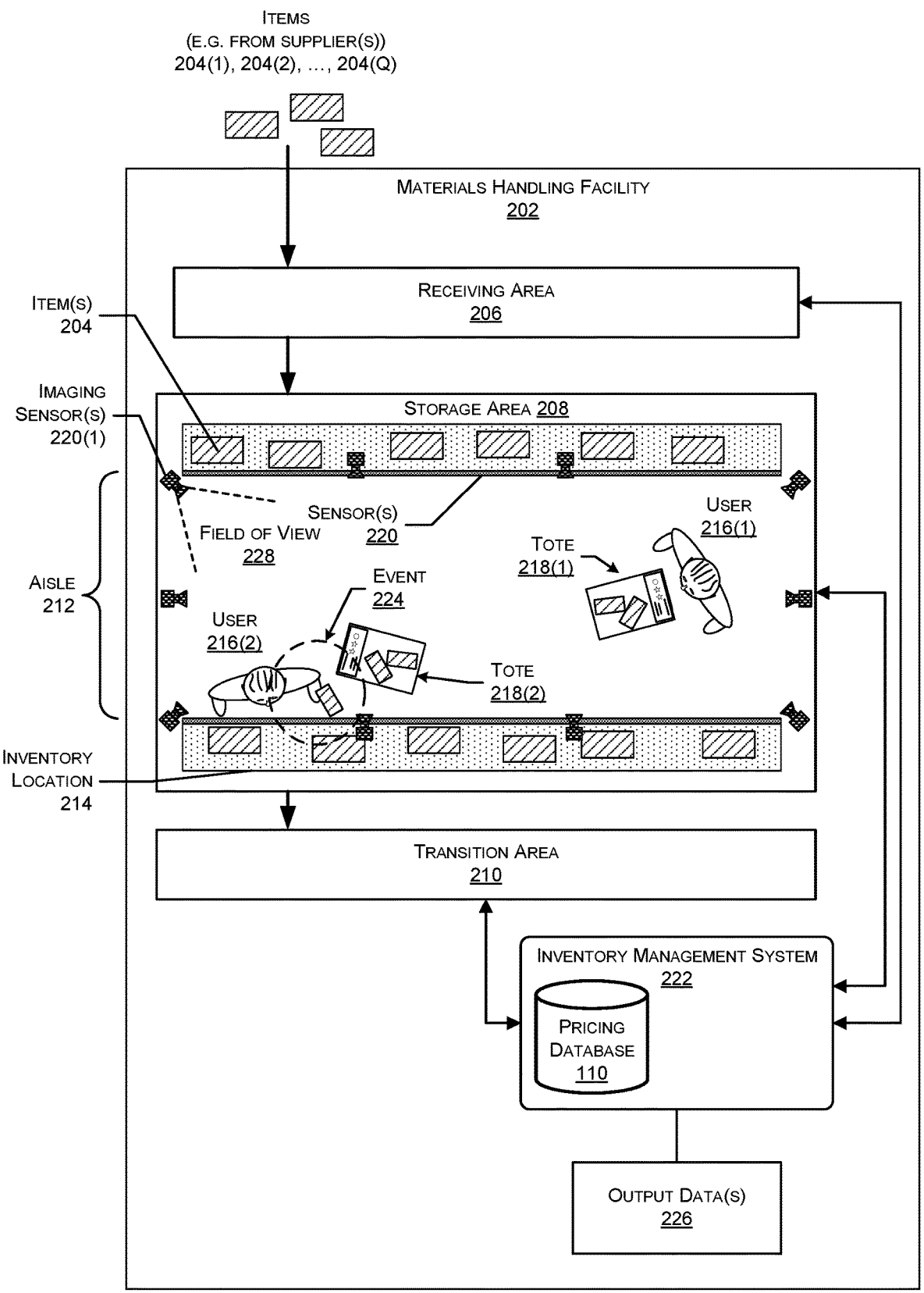
FIG. 2 is a block diagram of a materials handling facility that includes sensors and an inventory management system configured to generate output regarding events occurring in the facility using the sensor data. The events may include, for example, a user picking an item or returning an item. In some instances, the materials handling facility may represent an environment in which a user, such as the user from FIG. 1, may pick an item and exit the facility, at which point the user may be charged for a lowest price of the item between the time of the pick and the time of exit.

An implementation of a materials handling system 202 configured to store and manage inventory items is illustrated in FIG. 2. A materials handling facility 202 (facility) comprises one or more physical structures or areas within which one or more items 204(1), 204(2), . . . , 204(Q) (generally denoted as 204) may be held. As used in this disclosure, letters in parenthesis such as "(Q)" indicate an integer result. The items 204 comprise physical goods, such as books, pharmaceuticals, repair parts, electronic gear, groceries, and so forth.

The facility 202 may include one or more areas designated for different functions with regard to inventory handling. In this illustration, the facility 202 includes a receiving area 206, a storage area 208, and a transition area 210. The receiving area 206 may be configured to accept items 204, such as from suppliers, for intake into the facility 202. For example, the receiving area 206 may include a loading dock at which trucks or other freight conveyances unload the items 204.

The storage area 208 is configured to store the items 204. The storage area 208 may be arranged in various physical configurations. In one implementation, the storage area 208 may include one or more aisles 212. The aisle 212 may be configured with, or defined by, inventory locations 214 on one or both sides of the aisle 212. The inventory locations 214 may include one or more of shelves, racks, cases, cabinets, bins, floor locations, or other suitable storage mechanisms for holding or storing the items 204. The inventory locations 214 may be affixed to the floor or another portion of the facility's structure, or may be movable such that the arrangements of aisles 212 may be reconfigurable. In some implementations, the inventory locations 214 may be configured to move independently of an outside operator. For example, the inventory locations 214 may comprise a rack with a power source and a motor, operable by a computing device to allow the rack to move from one location within the facility 202 to another.

One or more users 216(1), 216(2), . . . , 216(U) (generally denoted as 116), totes 218(1), 218(2), . . . , 218(T) (generally denoted as 218) or other material handling apparatus may move within the facility 202. For example, the users 216 may move about within the facility 202 to pick or place the items 204 in various inventory locations 214, placing them on the totes 218 for ease of transport. An individual tote 218 is configured to carry or otherwise transport one or more items 204. For example, a tote 218 may include a basket, a cart, a bag, and so forth. In other implementations, other agencies such as robots, forklifts, cranes, aerial drones, and so forth, may move about the facility 202 picking, placing, or otherwise moving the items 204.

One or more sensors 220 may be configured to acquire information in the facility 202. The sensors 220 in the facility 202 may include sensors fixed in the environment (e.g., ceiling-mounted cameras) or otherwise, such as sensors in the possession of users (e.g., mobile phones, tablets, etc.). The sensors 220 may include, but are not limited to, cameras 220(1), weight sensors, radio frequency (RF) receivers, temperature sensors, humidity sensors, vibration sensors, and so forth. The sensors 220 may be stationary or mobile, relative to the facility 202. For example, the inventory locations 214 may contain cameras 220(1) configured to acquire images of pick or placement of items 204 on shelves, of the users 216(1) and 116(2) in the facility 202, and so forth. In another example, the floor of the facility 202 may include weight sensors configured to determine a weight of the users 216 or other object thereupon. The sensors 220 are discussed in more detail below with regard to FIG. 3.

During operation of the facility 202, the sensors 220 may be configured to provide information suitable for tracking how objects move or other occurrences within the facility 202. For example, a series of images acquired by an camera 220(1) may indicate removal of an item 204 from a particular inventory location 214 by one of the users 216 and placement of the item 204 on or at least partially within one of the totes 218.

While the storage area 208 is depicted as having one or more aisles 212, inventory locations 214 storing the items

204, sensors 220, and so forth, it is understood that the receiving area 206, the transition area 210, or other areas of the facility 202 may be similarly equipped. Furthermore, the arrangement of the various areas within the facility 202 is depicted functionally rather than schematically. For example, multiple different receiving areas 206, storage areas 208, and transition areas 210 may be interspersed rather than segregated in the facility 202.

The facility 202 may include, or be coupled to, an inventory management system 222. The inventory management system 222 is configured to identify interactions with and between users 216, devices such as sensors 220, robots, material handling equipment, computing devices, and so forth, in one or more of the receiving area 206, the storage area 208, or the transition area 210. These interactions may include one or more events 224. For example, events 224 may include the entry of the user 216 to the facility 202, stocking of items 204 at an inventory location 214, picking of an item 204 from an inventory location 214, returning of an item 106 to an inventory location 214, placement of an item 106 within a tote 218, movement of users 216 relative to one another, gestures by the users 216, and so forth. Other events 224 involving users 216 may include the user 216 providing authentication information in the facility 202, using a computing device at the facility 202 to authenticate identity to the inventory management system 222, and so forth. Some events 224 may involve one or more other objects within the facility 202. For example, the event 224 may comprise movement within the facility 202 of an inventory location 214, such as a counter mounted on wheels. Events 224 may involve one or more of the sensors 220. For example, a change in operation of a sensor 220, such as a sensor failure, change in alignment, and so forth, may be designated as an event 224. Continuing the example, movement of an camera 220(1) resulting in a change in the orientation of the field of view 228 (such as resulting from someone or something bumping the camera 220(1)) may be designated as an event 224.

By determining the occurrence of one or more of the events 224, the inventory management system 222 may generate output data 226. The output data 226 comprises information about the event 224. For example, where the event 224 comprises an item 204 being removed from an inventory location 214, the output data 226 may comprise an item identifier indicative of the particular item 204 that was removed from the inventory location 214 and a user identifier of a user that removed the item.

The inventory management system 222 may use one or more automated systems to generate the output data 226. For example, an artificial neural network, one or more classifiers, or other automated machine learning techniques may be used to process the sensor data from the one or more sensors 220 to generate output data 226. The automated systems may operate using probabilistic or non-probabilistic techniques. For example, the automated systems may use a Bayesian network. In another example, the automated systems may use support vector machines to generate the output data 226 or the tentative results. The automated systems may generate confidence level data that provides information indicative of the accuracy or confidence that the output data 226 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 204, user 216, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 216 may pick an item 204(1) such as a perfume bottle that is generally cubical in shape from the inventory location 214. Other items 204 at nearby inventory locations 214 may be predominately spherical. Based on the difference in shape (cube vs. sphere) from the adjacent items, and the correspondence in shape with the previously stored image of the perfume bottle item 204(1) (cubical and cubical), the confidence level that the user 114 has picked up the perfume bottle item 204(1) is high.

In some situations, the automated techniques may be unable to generate output data 226 with a confidence level above a threshold result. For example, the automated techniques may be unable to distinguish which user 216 in a crowd of users 216 has picked up the item 106 from the inventory location 214. In other situations, it may be desirable to provide human confirmation of the event 224 or of the accuracy of the output data 226. For example, some items 204 may be deemed age restricted such that they are to be handled only by users 216 above a minimum age threshold.

In instances where human confirmation is desired, sensor data associated with an event 224 may be processed to generate inquiry data. The inquiry data may include a subset of the sensor data associated with the event 224. The inquiry data may also include one or more of one or more tentative results as determined by the automated techniques, or supplemental data. The subset of the sensor data may be determined using information about the one or more sensors 220. For example, camera data such as the location of the camera 220(1) within the facility 202, the orientation of the camera 220(1), and a field of view 128 of the camera 220(1) may be used to determine if a particular location within the facility 202 is within the field of view 128. The subset of the sensor data may include images that may show the inventory location 214 or that the item 204 was stowed. The subset of the sensor data may also omit images from other cameras 220(1) that did not have that inventory location 214 in the field of view 128. The field of view 128 may comprise a portion of the scene in the facility 202 that the sensor 220 is able to generate sensor data about.

Continuing the example, the subset of the sensor data may comprise a video clip acquired by one or more cameras 220(1) having a field of view 228 that includes the item 106. The tentative results may comprise the "best guess" as to which items 204 may have been involved in the event 224. For example, the tentative results may comprise results determined by the automated system that have a confidence level above a minimum threshold.

The facility 202 may be configured to receive different kinds of items 204 from various suppliers and to store them until a customer orders or retrieves one or more of the items 204. A general flow of items 204 through the facility 202 is indicated by the arrows of FIG. 2. Specifically, as illustrated in this example, items 204 may be received from one or more suppliers, such as manufacturers, distributors, wholesalers, and so forth, at the receiving area 206. In various implementations, the items 204 may include merchandise, commodities, perishables, or any suitable type of item 106, depending on the nature of the enterprise that operates the facility 202. The receiving of the items 204 may comprise one or more events 224 for which the inventory management system 222 may generate output data 226.

Upon being received from a supplier at receiving area 206, the items 204 may be prepared for storage. For example, items 204 may be unpacked or otherwise rearranged. The inventory management system 222 may include one or more software applications executing on a computer system to provide inventory management functions based on the events 224 associated with the unpacking or rearrangement. These inventory management functions may include maintaining information indicative of the type, quantity, condition, cost, location, weight, or any other suitable parameters with respect to the items 204. The items 204 may be stocked, managed, or dispensed in terms of countable, individual units or multiples, such as packages, cartons, crates, pallets, or other suitable aggregations. Alternatively, some items 204, such as bulk products, commodities, and so forth, may be stored in continuous or arbitrarily divisible amounts that may not be inherently organized into countable units. Such items 204 may be managed in terms of measurable quantity such as units of length, area, volume, weight, time, duration, or other dimensional properties characterized by units of measurement. Generally speaking, a quantity of an item 204 may refer to either a countable number of individual or aggregate units of an item 204 or a measurable amount of an item 204, as appropriate.

After arriving through the receiving area 206, items 204 may be stored within the storage area 208. In some implementations, like items 204 may be stored or displayed together in the inventory locations 214 such as in bins, on shelves, hanging from pegboards, and so forth. In this implementation, all items 204 of a given kind are stored in one inventory location 214. In other implementations, like items 204 may be stored in different inventory locations 214. For example, to optimize retrieval of certain items 204 having frequent turnover within a large physical facility 202, those items 204 may be stored in several different inventory locations 214 to reduce congestion that might occur at a single inventory location 214. Storage of the items 204 and their respective inventory locations 214 may comprise one or more events 224.

When a customer order specifying one or more items 204 is received, or as a user 216 progresses through the facility 202, the corresponding items 204 may be selected or "picked" from the inventory locations 214 containing those items 204. In various implementations, item picking may range from manual to completely automated picking. For example, in one implementation, a user 216 may have a list of items 204 they desire and may progress through the facility 202 picking items 204 from inventory locations 214 within the storage area 208, and placing those items 204 into a tote 218. In other implementations, employees of the facility 202 may pick items 204 using written or electronic pick lists derived from customer orders. These picked items 204 may be placed into the tote 218 as the employee progresses through the facility 202. Picking may comprise one or more events 224, such as the user 216 in moving to the inventory location 214, retrieval of the item 204 from the inventory location 214, and so forth.

After items 204 have been picked, they may be processed at a transition area 210. The transition area 210 may be any designated area within the facility 202 where items 204 are transitioned from one location to another or from one entity to another. For example, the transition area 210 may be a packing station within the facility 202. When the item 106 arrives at the transition area 210, the items 204 may be transitioned from the storage area 208 to the packing station. The transitioning may comprise one or more events 224. Information about the transition may be maintained by the inventory management system 222 using the output data 226 associated with those events 224.

In another example, if the items 204 are departing the facility 202 a list of the items 204 may be obtained and used by the inventory management system 222 to transition responsibility for, or custody of, the items 204 from the facility 202 to another entity. For example, a carrier may accept the items 204 for transport with that carrier accepting responsibility for the items 204 indicated in the list. In another example, a customer may purchase or rent the items 204 and remove the items 204 from the facility 202. The purchase or rental may comprise one or more events 224.

The inventory management system 222 may access or generate sensor data about the facility 202 and the contents therein including the items 204, the users 216, the totes 218, and so forth. The sensor data may be acquired by one or more of the sensors 220, data provided by other systems, and so forth. For example, the sensors 220 may include cameras 220(1) configured to acquire image data of scenes in the facility 202. The image data may comprise still images, video, or a combination thereof. The image data may be processed by the inventory management system 222 to determine a location of the user 216, the tote 218, the identity of the user 216, and so forth. As used herein, the identity of the user may represent a unique identifier of the user (e.g., name, number associated with user, username, etc.), an identifier that distinguishes the user amongst other users being tracked with the environment, or the like. The sensors 220 are discussed in more detail below with regard to FIG. 3.

The inventory management system 222, or systems coupled thereto, may be configured to identify the user 216, as well as to determine other candidate users. In one implementation, this determination may comprise comparing sensor data with previously stored identity data. For example, the user 216 may be identified by showing their face to a facial recognition system, by presenting a token carrying authentication credentials, providing a fingerprint, scanning a barcode or other type of unique identifier upon entering the facility, and so forth. Identity of the user 216 may be determined before, during, or after entry to the facility 202. Determination of the user's 216 identity may comprise comparing sensor data associated with the user 216 in the facility 202 to previously stored user data.

In some instances, the inventory management system group users within the facility into respective sessions. That is, the inventory management system 222 may utilize the sensor data to determine groups of users that are effectively "together" (e.g., shopping together). In some instances, a particular session may include multiple users that entered the facility 202 together and, potentially, that navigate the facility together. For example, when a family of two adults and two children enter the facility together, the inventory management system may associate each user with a particular session. Tracking sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 218. Noting the child and the mother as belonging to the same session may increase the chances of successfully adding the box of cereal to the virtual shopping cart of the mother.

By determining the occurrence of one or more events 224 and the output data 226 associated therewith, the inventory management system 222 is able to provide one or more services to the users 216 of the facility 202. By utilizing one or more human associates to process inquiry data and generate response data that may then be used to produce output data 226, overall accuracy of the system may be enhanced. The enhanced accuracy may improve the user experience of the one or more users 216 of the facility 202.

Figure 3:
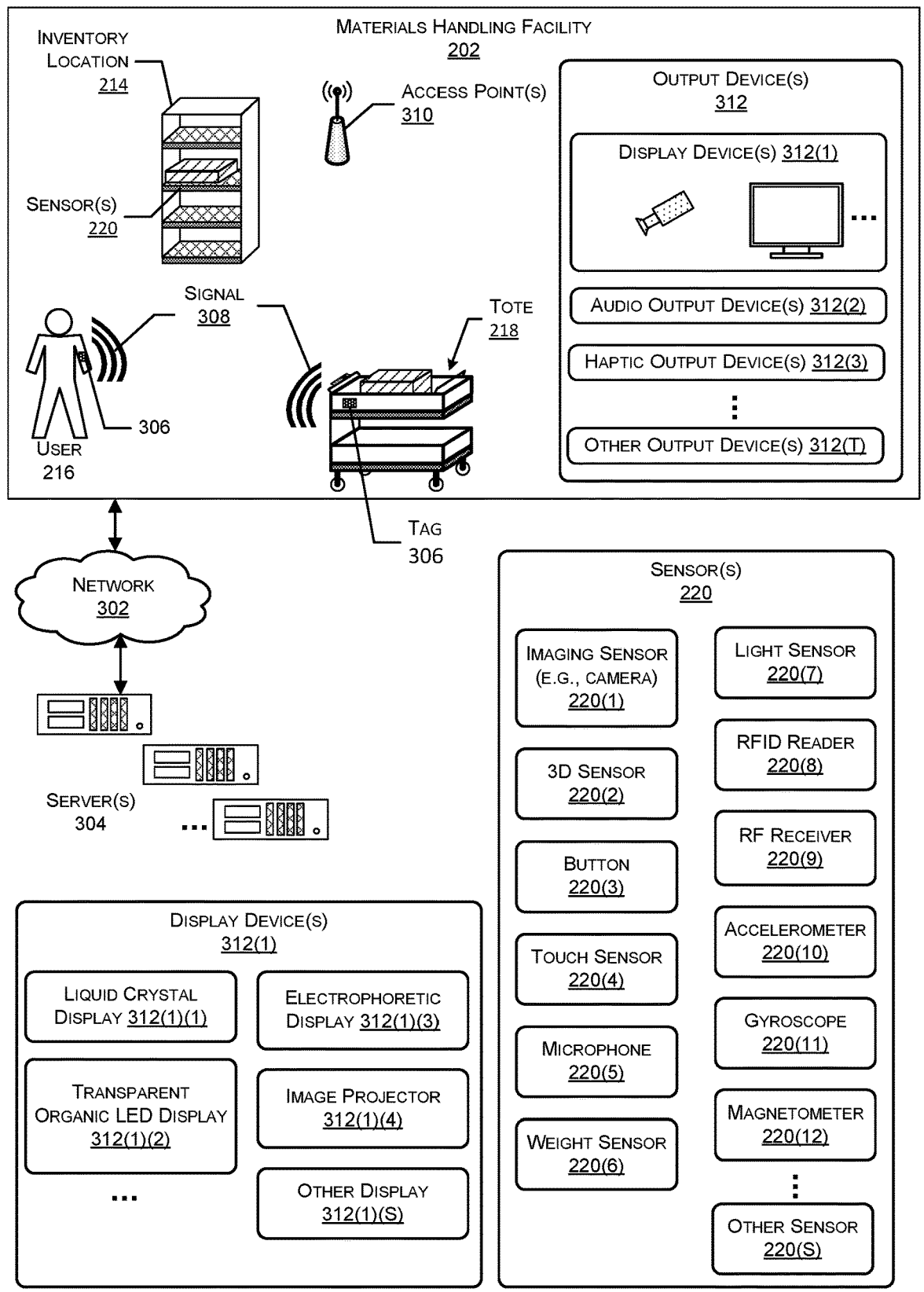
FIG. 3 is a block diagram illustrating additional details of the facility, including example sensors that may facilitate determining events with the facility, such as when a user enters the facility, picks (or returns) an item, or leaves the facility. The identification of these events may aid in determining the appropriate prices to charge a user for any items he or she may have picked.

FIG. 3 is a block diagram illustrating additional details of the facility 202, according to some implementations. The facility 202 may be connected to one or more networks 302, which in turn connect to one or more servers 304. The network 302 may include private networks such as an institutional or personal intranet, public networks such as the Internet, or a combination thereof. The network 302 may utilize wired technologies (e.g., wires, fiber optic cable, and so forth), wireless technologies (e.g., radio frequency, infrared, acoustic, optical, and so forth), or other connection technologies. The network 302 is representative of any type of communication network, including one or more of data networks or voice networks. The network 302 may be implemented using wired infrastructure (e.g., copper cable, fiber optic cable, and so forth), a wireless infrastructure (e.g., cellular, microwave, satellite), or other connection technologies.

The servers 304 may be configured to execute one or more modules or software applications associated with the inventory management system 222. While the servers 304 are illustrated as being in a location outside of the facility 202, in other implementations, at least a portion of the servers 304 may be located at the facility 202. The servers 304 are discussed in more detail below with regard to FIG. 4.

The users 216, the totes 218, or other objects in the facility 202 may be equipped with one or more tags 306, such as radio frequency (RF) tags. The tags 306 may be configured to emit a signal 308. In one implementation, the tag 306 may be a radio frequency identification (RFID) tag configured to emit a RF signal 308 upon activation by an external signal. For example, the external signal may comprise a radio frequency signal or a magnetic field configured to energize or activate the RFID tag 306. In another implementation, the tag 306 may comprise a transmitter and a power source configured to power the transmitter. For example, the tag 306 may comprise a Bluetooth Low Energy (BLE) transmitter and battery. In other implementations, the tag 306 may use other techniques to indicate presence. For example, an acoustic tag 306 may be configured to generate an ultrasonic signal which is detected by corresponding acoustic receivers. In yet another implementation, the tag 306 may be configured to emit an optical signal.

The inventory management system 222 may be configured to use the tags 306 for one or more of identification of the object, determining a location of the object, and so forth. For example, the users 216 may wear tags 306, the totes 218 may have tags 306 affixed, and so forth, which may be read and, based at least in part on signal strength, used to determine identity and location. Generally, the inventory management system 222 or other systems associated with the facility 202 may include any number and combination of input components, output components, and servers 304.

The one or more sensors 220 may be arranged at one or more locations within the facility 202. For example, the sensors 220 may be mounted on or within a floor, wall, at a ceiling, at an inventory location 214, on the tote 218, may be carried or worn by the user 216, and so forth. The sensors 220 produce respective sensor data.

The sensors 220 may include one or more cameras 220(1). These cameras 220(1) may include cameras configured to acquire images of a scene. The cameras 220(1) are configured to detect light in one or more wavelengths including, but not limited to, terahertz, infrared, visible, ultraviolet, and so forth. The cameras 220(1), as well as any image sensors described herein, may provide sensor data in the form of the image data, in the form of indications of what item was picked or return and the location of the item, combinations thereof, and/or the like. The inventory management system 222 may use image data acquired by the cameras 220(1) during operation of the facility 202. For example, the inventory management system 222 may identify items 204, identify users 216, identify totes 218, determine a location, and so forth, based at least in part on their appearance within the image data.

One or more three-dimensional (3D) sensors 220(2) may also be included in the sensors 220. The 3D sensors 220(2) are configured to acquire spatial or 3D data, such as depth information, about objects within a sensor field-of-view. The 3D sensors 220(2) include range cameras, lidar systems, sonar systems, radar systems, structured light systems, stereo vision systems, optical interferometry systems, and so forth. The inventory management system 222 may use the 3D data acquired to identify objects, determine a location of an object, and so forth. For example, the inventory management system 222 may determine operational data such as location in the facility 202 of the user 216 based at least in part on the location in 3D space of the user 216.

One or more buttons 220(3) are configured to accept input from the user 216. The buttons 220(3) may comprise mechanical, capacitive, optical, or other mechanisms. For example, the buttons 220(3) may comprise mechanical switches configured to accept an applied force from a touch of the user 216 to generate an input signal. The inventory management system 222 may use data from the buttons 220(3) to receive information from the user 216 and produce button data.

The sensors 220 may include one or more touch sensors 220(4). The touch sensors 220(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 222 may use data from the touch sensors 220(4) to receive information from the user 216. For example, the touch sensor 220(4) may be integrated with the tote 218 to provide a touchscreen with which the user 216 may select from a menu one or more particular items 204 for picking.

One or more microphones 220(5) may be configured to acquire information indicative of sound present in the environment and generate audio data. In some implementations, arrays of microphones 220(5) may be used. These arrays may implement beamforming techniques to provide for directionality of gain. The inventory management system 222 may use the one or more microphones 220(5) to acquire information from acoustic tags, accept voice input from the users 216, determine the location of one or more users 216 in the facility 202, determine ambient noise level, and so forth.

One or more weight sensors 220(6) are configured to measure the weight of a load, such as the item 106, the user 216, the tote 218, and so forth and generate weight data. The weight sensors 220(6) may be configured to measure the weight of the load at one or more of the inventory locations 214, the tote 218, or on the floor of the facility 202. The weight sensors 220(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 222 may use the data acquired by the weight sensors 220(6) to identify an object, determine a location of an object, maintain shipping records, identify the user 216, and so forth. In addition to the weight data, the weight sensors 220(6) may send an indication of an item picked or returned and a location of the item, an indication of a cost of an item removed, combinations there, and/or the like. Further, each of the sensors 220 may provide this type of data.

The sensors 220 may include one or more light sensors 220(7) configured to generate light sensor data. The light sensors 220(7) may be configured to provide information associated with ambient lighting conditions such as a level of illumination. Information acquired by the light sensors 220(7) may be used by the inventory management system 222 to adjust a level, intensity, or configuration of the user interface.

One more radio frequency identification (RFID) readers 220(8), near field communication (NFC) systems, and so forth, may also be provided in the sensors 220. For example, the RFID readers 220(8) may be configured to read the tags 306 and generate RFID tag data. Information acquired by the RFID reader 220(8) may be used by the inventory management system 222 to identify an object associated with the tag 306 such as the item 106, the user 216, the tote 218, and so forth. For example, based on information from the RFID readers 220(8), a velocity of the tag 306 may be determined.

One or more RF receivers 220(9) may also be provided in the sensors 220 to generate radio-frequency data. In some implementations, the RF receivers 220(9) may be part of transceiver assemblies. The RF receivers 220(9) may be configured to acquire RF signals 308 associated with Wi-Fi™, Bluetooth®, ZigBee®, Z-Wave, 3G, 4G, LTE, or other wireless data transmission technologies. The RF receivers 220(9) may provide information associated with data transmitted via radio frequencies, signal strength of RF signals 308, and so forth. For example, information from the RF receivers 220(9) may be used by the inventory management system 222 to determine a location of an RF source, such as a communication interface onboard the tote 218 or carried by the user 216.

The sensors 220 may include one or more accelerometers 220(10) that may be worn or carried by the user 216, mounted to the tote 218, and so forth. The accelerometers 220(10) may provide accelerometer data such as the direction and magnitude of an imposed acceleration. Data such as rate of acceleration, determination of changes in direction, speed, and so forth, may be determined using the accelerometers 220(10).

A gyroscope 220(11) provides gyroscope data indicative of rotation of an object affixed thereto. For example, the tote 218, the user 216, or other objects may be equipped with a gyroscope 220(11) to provide data indicative of a change in orientation.

A magnetometer 220(12) may be used to determine an orientation by measuring ambient magnetic fields, such as the terrestrial magnetic field. The magnetometer 220(12) may generate magnetometer data indicative of the direction, strength, and so forth of a magnetic field. The magnetometer 220(12) may be worn or carried by the user 216, mounted to the tote 218, and so forth. For example, the magnetometer 220(12) mounted to the tote 218 may act as a compass and provide information indicative of which way the tote 218 is oriented.

The sensors 220 may include other sensors 220(S) as well. For example, the other sensors 220(S) may include proximity sensors, ultrasonic rangefinders, thermometers, barometric sensors, hygrometers, biometric input devices including, but not limited to, fingerprint readers or palm scanners, and so forth. For example, the inventory management system 222 may use information acquired from thermometers and hygrometers in the facility 202 to direct the user 216 to check on delicate items 204 stored in a particular inventory location 214.

The facility 202 may include one or more access points 310 configured to establish one or more wireless networks and the network 302. The access points 310 may use Wi-Fi™, NFC, Bluetooth®, or other technologies to establish wireless communications between a device and the network 302. The wireless networks allow the devices to communicate with one or more of the inventory management system 222, the sensors 220, the tag 306, a communication device of the tote 218, or other devices.

Output devices 312 may also be provided in the facility 202. The output devices 312 are configured to generate signals which may be perceived by the user 216. The output devices 312 may include display devices 312(1), audio output devices 312(2), haptic output devices 312(3), or other output devices 312(T).

The display devices 312(1) may be configured to provide output which may be seen by the user 216 or detected by a light-sensitive detector such as an camera 220(1) or light sensor 220(7). The output may be monochrome or color. The display devices 312(1) may be emissive, reflective, or both. An emissive display device 312(1) is configured to emit light during operation. For example, a light emitting diode (LED) is an emissive visual display device 312(1). In comparison, a reflective display device 312(1) relies on ambient light to present an image. For example, an electrophoretic display 312(1)(3) is a reflective display device 312(1). Backlights or front lights may be used to illuminate the reflective visual display device 312(1) to provide visibility of the information in conditions where the ambient light levels are low.

Mechanisms of the display devices 312(1) may include liquid crystal displays 212(1)(1), transparent organic LED displays 312(1)(2), electrophoretic displays 312(1)(3), image projectors 312(1)(4), or other displays 312(1)(S). The other displays 312(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 312(1) may be configured to present images. For example, the display devices 312(1) may comprise a pixel-addressable display. The image may comprise at least a two-dimensional array of pixels or a vector representation of an at least two-dimensional image.

In some implementations, the display devices 312(1) may be configured to provide non-image data, such as text characters, colors, and so forth. For example, a segmented electrophoretic display 312(1)(3), segmented LED, and so forth, may be used to present information such as a stock keeping unit (SKU) number. The display devices 312(1) may also be configurable to vary the color of the text, such as using multicolor LED segments.

In some implementations, display devices 312(1) may be configurable to provide image or non-image output. For example, an electrophoretic display 312(1)(3) with addressable pixels may be used to present images of text information, or all of the pixels may be set to a solid color to provide a colored panel.

One or more audio output devices 312(2) are configured to provide acoustic output. The acoustic output includes one or more of infrasonic sound, audible sound, or ultrasonic sound. The audio output devices 312(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 312(3) are configured to provide a signal which results in a tactile sensation to the user 216. The haptic output devices 312(3) may use one or more mechanisms such as electrical stimulation or mechanical displacement to provide the signal. For example, the haptic output devices 312(3) may be configured to generate a modulated electrical signal, which produces an apparent tactile sensation in one or more fingers of the user 216. In another example, the haptic output devices 312(3) may comprise piezoelectric or rotary motor devices configured to provide a vibration, which may be felt by the user 216.

The facility 202 may include an interface device that comprises the sensors 220, the output devices 312, or both. For example, the tote 218 may include an interface device such as a display device 312(1) and a touch sensor 320(4). In some implementations, the interface device may include hardware processors, memory, and other elements configured to present a user interface, process input to the user interface, and so forth. Users 216, associates, or both users 216 and associates may use the interface device.

Other output devices 312(T) may also be present. For example, the other output devices 312(T) may include scent/odor dispensers, document printers, 3D printers or fabrication equipment, and so forth.

The inventory management system 222 may generate user interface data, which is then used by the interface device to present the user interface. The user interface may be configured to stimulate one or more senses of the user 216 or associate. For example, the user interface may comprise visual, audible, and haptic output.

Figure 4:
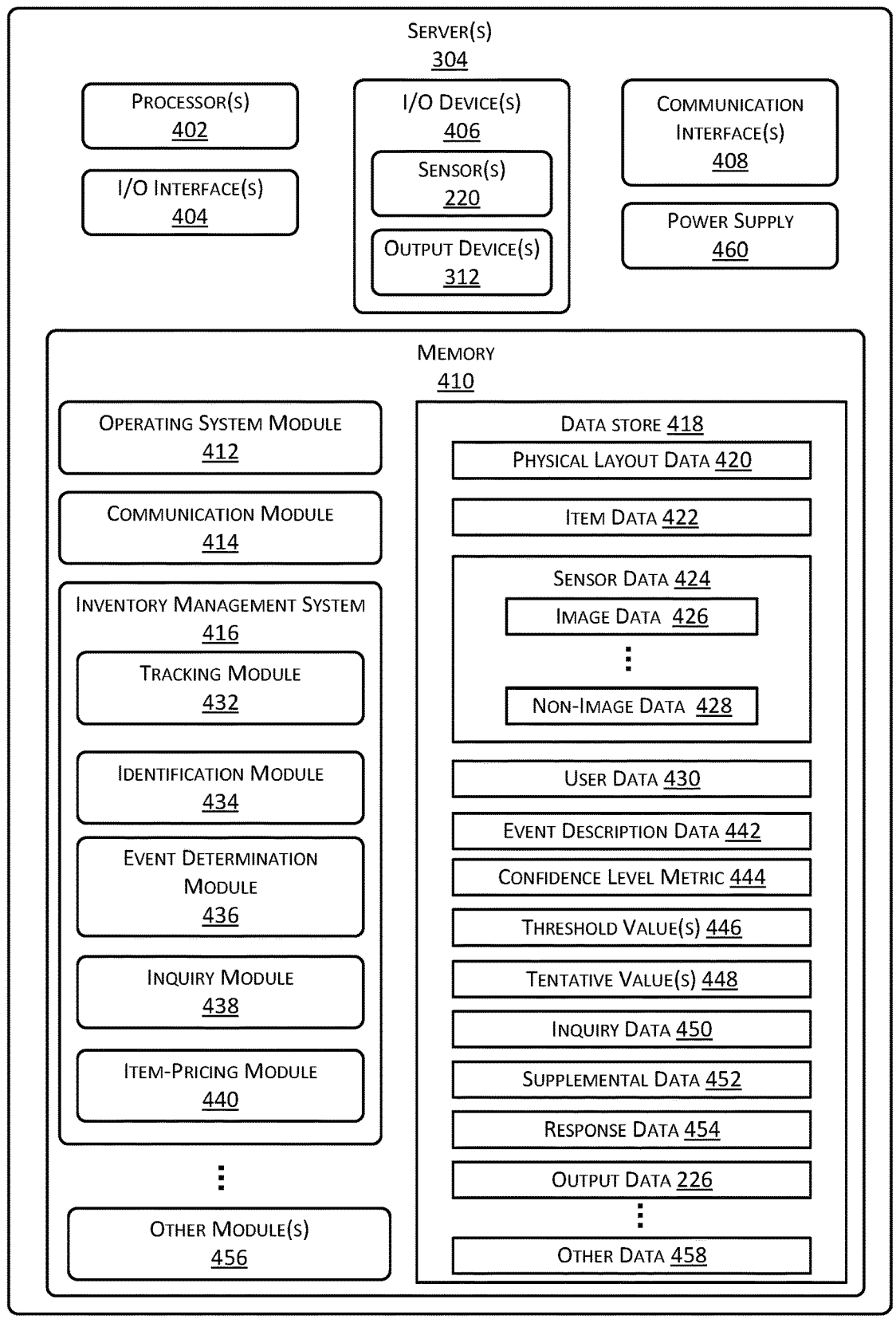
FIG. 4 illustrates a block diagram of one or more servers configured to support operation of the facility. As illustrated, the servers may host the inventory management system that is configured, in part, to determine the appropriate prices for items picked by users.

FIG. 4 illustrates a block diagram of the one or more servers 304. The servers 304 may be physically present at the facility 202, may be accessible by the network 302, or a combination of both. The servers 304 does not require end-user knowledge of the physical location and configuration of the system that delivers the services. Common expressions associated with the servers 304 may include "on-demand computing," "software as a service (SaaS)," "platform computing," "network-accessible platform," "cloud services," "data centers," and so forth. Services provided by the servers 304 may be distributed across one or more physical or virtual devices.

The servers 304 may include one or more hardware processors 402 (processors) configured to execute one or more stored instructions. The processors 402 may comprise one or more cores. The servers 304 may include one or more input/output (I/O) interface(s) 404 to allow the processor 402 or other portions of the servers 304 to communicate with other devices. The I/O interfaces 404 may comprise Inter-Integrated Circuit (I2C), Serial Peripheral Interface bus (SPI), Universal Serial Bus (USB) as promulgated by the USB Implementers Forum, RS-232, and so forth.

The servers 304 may also include one or more communication interfaces 406. The communication interfaces 406 are configured to provide communications between the servers 304 and other devices, such as the sensors 220, the interface devices, routers, the access points 310, and so forth. The communication interfaces 406 may include devices configured to couple to personal area networks (PANs), wired and wireless local area networks (LANs), wired and wireless wide area networks (WANs), and so forth. For example, the communication interfaces 406 may include devices compatible with Ethernet, Wi-Fi™, and so forth. The servers 304 may also include one or more busses or other internal communications hardware or software that allow for the transfer of data between the various modules and components of the servers 304.

The servers 304 may also include a power supply 408. The power supply 408 is configured to provide electrical power suitable for operating the components in the servers 304.

As shown in FIG. 4, the servers 304 includes one or more memories 410. The memory 410 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 410 provides storage of computer-readable instructions, data structures, program modules, and other data for the operation of the servers 304. A few example functional modules are shown stored in the memory 410, although the same functionality may alternatively be implemented in hardware, firmware, or as a system on a chip (SOC).

The memory 410 may include at least one operating system (OS) module 412. The OS module 412 is configured to manage hardware resource devices such as the I/O interfaces 404, the communication interfaces 306, and provide various services to applications or modules executing on the processors 402. The OS module 412 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following modules may also be stored in the memory 410. These modules may be executed as foreground applications, background tasks, daemons, and so forth.

A communication module 414 may be configured to establish communications with one or more of the sensors 220, one or more of the devices used by associates, other servers 304, or other devices. The communications may be authenticated, encrypted, and so forth.

The memory 410 may store an inventory management system 416. The inventory management system 416 is configured to provide the inventory functions as described herein with regard to the inventory management system 222. For example, the inventory management system 416 may track movement of items 204 in the facility 202, generate user interface data, and so forth.

The inventory management system 416 may access information stored in one or more data stores 418 in the memory 410. The data store 418 may use a flat file, database, linked list, tree, executable code, script, or other data structure to store the information. In some implementations, the data store 418 or a portion of the data store 418 may be distributed across one or more other devices including other servers 304, network attached storage devices, and so forth.

The data store 418 may include physical layout data 420. The physical layout data 420 provides a mapping of physical locations within the physical layout of devices and objects such as the sensors 220, inventory locations 214, and so forth. The physical layout data 420 may indicate the coordinates within the facility 202 of an inventory location 214, sensors 220 within view of that inventory location 214, and so forth. For example, the physical layout data 420 may include camera data comprising one or more of a location within the facility 202 of an camera 220(1), orientation of the camera 220(1), the operational status, and so forth. Continuing example, the physical layout data 420 may indicate the coordinates of the camera 220(1), pan and tilt information indicative of a direction that the field of view 228 is oriented along, whether the camera 220(1) is operating or malfunctioning, and so forth.

In some implementations, the inventory management system 416 may access the physical layout data 420 to determine if a location associated with the event 224 is within the field of view 128 of one or more sensors 220. Continuing the example above, given the location within the facility 202 of the event 224 and the camera data, the inventory management system 416 may determine the cameras 220(1) that may have generated images of the event 224.

The item data 422 comprises information associated with the items 204. The information may include information indicative of one or more inventory locations 214 at which one or more of the items 204 are stored. The item data 422 may also include order data, SKU or other product identifier, price, quantity on hand, weight, expiration date, images of the item 106, detail description information, ratings, ranking, and so forth. The inventory management system 416 may store information associated with inventory management functions in the item data 422.

The data store 418 may also include sensor data 424. The sensor data 424 comprises information acquired from, or based on, the one or more sensors 220. For example, the sensor data 424 may comprise 3D information about an object in the facility 202. As described above, the sensors 220 may include an camera 220(1), which is configured to acquire one or more images. These images may be stored as the image data 426. The image data 426 may comprise information descriptive of a plurality of picture elements or pixels. Non-image data 428 may comprise information from other sensors 220, such as input from the microphones 220(5), weight sensors 220(6), and so forth.

User data 430 may also be stored in the data store 418. The user data 430 may include identity data, information indicative of a profile, purchase history, location data, images of the user 216, demographic data, and so forth. Individual users 216 or groups of users 216 may selectively provide user data 430 for use by the inventory management system 222. The individual users 216 or groups of users 216 may also authorize collection of the user data 430 during use of the facility 202 or access to user data 430 obtained from other systems. For example, the user 216 may opt-in to collection of the user data 430 to receive enhanced services while using the facility 202.

In some implementations, the user data 430 may include information designating a user 216 for special handling. For example, the user data 430 may indicate that a particular user 216 has been associated with an increased number of errors with respect to output data 226. The inventory management system 416 may be configured to use this information to apply additional scrutiny to the events 224 associated with this user 216. For example, events 224 that include an item 106 having a cost or result above the threshold amount may be provided to the associates for processing regardless of the determined level of confidence in the output data 226 as generated by the automated system.

The inventory management system 416 may include one or more of a tracking module 432, identification module 434, event determination module 436, inquiry module 438, and an item-pricing module 440.

The tracking module 432 functions to track items or users within the environment of the facility to allow the inventory management system 416 to assign certain events to the correct users. That is, the tracking module 432 may assign unique identifiers to users as they enter the facility and, with the users' consent, may track the users throughout the facility 202 over the time they remain in the facility 202. The tracking module 432 may perform this tracking using sensor data 424, such as the image data 426. For example, the tracking module 432 may receive the image data 426 and may use facial-recognition techniques to identify users from the images. After identifying a particular user within the facility, the tracking module 432 may then track the user within the images as the user moves throughout the facility 202. Further, should the tracking module 432 temporarily "lose" a particular user, the tracking module 432 may again attempt to identify the users within the facility based on facial recognition, and/or using other techniques such as voice recognition, or the like.

Therefore, upon receiving the indication of the time and location of the event in question, the tracking module 432 may query the data store 418 to determine which one or more users were at or within a threshold distance of the location of the event at the particular time of the event. Further, the tracking module 432 may assign different confidence levels to different users, with the confidence levels indicating how likely it is that each corresponding user is the user that is in fact associated with the event of interest. In some instances, the tracking module 432 returns, The tracking module 432 may access the sensor data 424 in order to determine this location data of the user and/or items. The location data provides information indicative of a location of an object, such as the item 204, the user 216, the tote 218, and so forth. The location may be absolute with respect to the facility 202 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 202, 5.2 m from an inventory location 114 along a heading of 169°, and so forth. For example, the location data may indicate that the user 216(1) is 25.2 m along the aisle 212(1) and standing in front of the inventory location 114. In comparison, a relative location may indicate that the user 216(1) is 32 cm from the tote 218 at a heading of 730 with respect to the tote 118. The location data may include orientation information, such as which direction the user 216 is facing. The orientation may be determined by the relative direction the user's 216 body is facing. In some implementations, the orientation may be relative to the interface device. Continuing the example, the location data may indicate that the user 216(1) is oriented with a heading of 0°, or looking north. In another example, the location data may indicate that the user 216 is facing towards the interface device.

The identification module 434 is configured to identify an object. In one implementation, the identification module 434 may be configured to identify an item 204. In another implementation, the identification module 434 may be configured to identify the user 216. For example, the identification module 434 may use facial recognition techniques to process the image data 426 and determine the identity data of the user 216 depicted in the images by comparing the characteristics in the image data 426 with previously stored results. The identification module 434 may also access data from other sensors 220, such as from the RFID reader 220(8), the RF receiver 220(9), fingerprint sensors, and so forth.

Facial recognition may include analyzing facial characteristics which are indicative of one or more facial features in an image, 3D data, or both. For example, the face of the user 216 may be detected within one or more of the images of the image data 426. The facial features include measurements of, or comparisons between, facial fiducials or ordinal points. The facial features may include eyes, mouth, lips, nose, chin, ears, face width, skin texture, 3D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 216. The eigenvectors or other measurements may be compared with previously stored characteristics to determine the user data 430 of the person in the image or to distinguish one user 216 from another.

The event determination module 436 is configured to process the sensor data 424 and generate output data 226. The event determination module 436 may access information stored in the data store 418 including, but not limited to, event description data 442, confidence levels 444, or threshold values 446.

The event description data 442 comprises information indicative of one or more events 224. For example, the event description data 442 may comprise predefined profiles that designate movement of an item 204 from an inventory location 214 with the event 224 of "pick". The event description data 442 may be manually generated or automatically generated. The event description data 442 may include data indicative of triggers associated with events occurring in the facility 202. An event may be determined as occurring upon detection of the trigger. For example, sensor data 424 such as a change in weight from a weight sensor 220(6) at an inventory location 214 may trigger detection of an event of an item 204 being added or removed from the inventory location 214. In another example, the trigger may comprise an image of the user 216 reaching a hand toward the inventory location 214. In yet another example, the trigger may comprise two or more users 216 approaching to within a threshold distance of one another.

The event determination module 436 may process the sensor data 424 using one or more techniques including, but not limited to, artificial neural networks, classifiers, decision trees, support vector machines, Bayesian networks, and so forth. For example, the event determination module 436 may use a decision tree to determine occurrence of the "pick" event 224 based on sensor data 424. The event determination module 436 may further use the sensor data 424 to determine one or more tentative results 448. The one or more tentative results 448 comprise data associated with the event 224. For example, where the event 224 comprises a disambiguation of users 216, the tentative results 448 may comprise a list of possible user 216 identities. In another example, where the event 224 comprises a disambiguation between items 104, the tentative results 448 may comprise a list of possible item identifiers. In some implementations, the tentative result 448 may indicate the possible action. For example, the action may comprise the user 216 picking, placing, moving an item 204, damaging an item 204, providing gestural input, and so forth.

In some implementations, the tentative results 448 may be generated by other modules. For example, the tentative results 448 such as one or more possible identities or locations of the user 216 involved in the event 224 may be generated by the tracking module 432. In another example, the tentative results 448 such as possible items 204 that may have been involved in the event 224 may be generated by the identification module 434.

The event determination module 436 may be configured to provide a confidence level 444 associated with the determination of the tentative results 448. The confidence level 444 provides indicia as to the expected level of accuracy of the tentative result 448. For example, a low confidence level 444 may indicate that the tentative result 448 has a low probability of corresponding to the actual circumstances of the event 224. In comparison, a high confidence level 444 may indicate that the tentative result 448 has a high probability of corresponding to the actual circumstances of the event 224.

In some implementations, the tentative results 448 having confidence levels 444 that exceed the threshold result 446 may be deemed to be sufficiently accurate and thus may be used as the output data 226. For example, the event determination module 436 may provide tentative results 448 indicative of the three possible items 204(1), 204(2), and 204(3) corresponding to the "pick" event 224. The confidence levels 444 associated with the possible items 204(1), 204(2), and 204(3) may be 25%, 70%, 92%, respectively. Continuing the example, the threshold result 346 may be set such that confidence level 444 of 90% are deemed to be sufficiently accurate. As a result, the event determination module 436 may designate the "pick" event 224 as involving item 204(3).

The inquiry module 438 may be configured to use at least a portion of the sensor data 424 associated with the event 224 to generate inquiry data 450. In some implementations, the inquiry data 450 may include one or more of the tentative results 448 or supplemental data 452. The inquiry module 438 may be configured to provide inquiry data 450 to one or more devices associated with one or more human associates.

An associate user interface is presented on the respective devices of associates. The associate may generate response data 454 by selecting a particular tentative result 448, entering new information, indicating that they are unable to answer the inquiry, and so forth.

The supplemental data 452 comprises information associated with the event 224 or that may be useful in interpreting the sensor data 424. For example, the supplemental data 452 may comprise previously stored images of the items 204. In another example, the supplemental data 452 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 426 during presentation to an associate.

The inquiry module 438 processes the response data 454 provided by the one or more associates. The processing may include calculating one or more statistical results associated with the response data 454. For example, statistical results may include a count of the number of times associates selected a particular tentative result 448, determination of a percentage of the associates that selected a particular tentative result 448, and so forth.

The inquiry module 438 is configured to generate the output data 226 based at least in part on the response data 454. For example, given that a majority of the associates returned response data 454 indicating that the item 204 associated with the "pick" event 224 is item 204(5), the output data 226 may indicate that the item 204(5) was picked.

The inquiry module 438 may be configured to selectively distribute inquiries to particular associates. For example, some associates may be better suited to answering particular types of inquiries. Performance data, such as statistical data about the performance of the associates, may be determined by the inquiry module 438 from the response data 454 provided by the associates. For example, information indicative of a percentage of different inquiries in which the particular associate selected response data 454 that disagreed with the majority of associates may be maintained. In some implementations, test or practice inquiry data 450 having a previously known correct answer may be provided to the associate for training or quality assurance purposes. The determination of the set of associates to use may be based at least in part on the performance data.

By using the inquiry module 438, the event determination module 436 may be able to provide high reliability output data 226 that accurately represents the event 224. The output data 226 generated by the inquiry module 438 from the response data 454 may also be used to further train the automated systems used by the inventory management system 416. For example, the sensor data 424 and the output data 226, based on response data 454, may be provided to one or more of the modules of the inventory management system 416 for training in process improvement. Continuing the example, this information may be provided to an artificial neural network, Bayesian network, and so forth, to further train these systems such that the confidence level 444 and the tentative results 448 produced in the future for the same or similar input is improved.

Figure 5A:
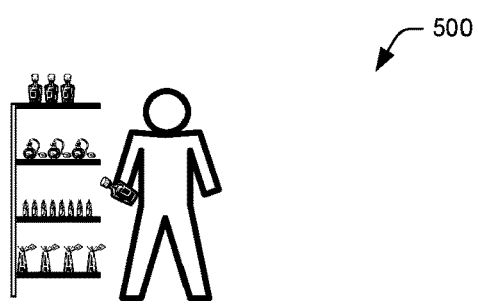
FIGS. 5A-B collectively illustrate a flow diagram of an example process for using sensor data to determine when a user picks an item, a first price of the item when picked, an occurrence of a predefined event, and a second price of the item upon occurrence of the predefined event. The process then determines which price is lesser and charges an account of the user for the lesser price.
Figure 5A:
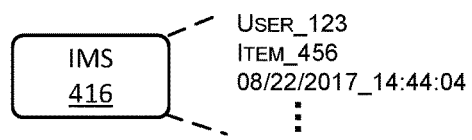
Figure 5A:
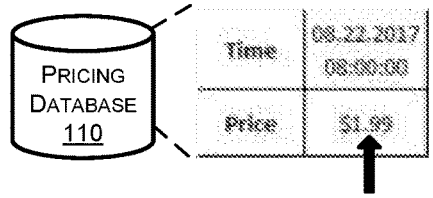
Figure 5A:
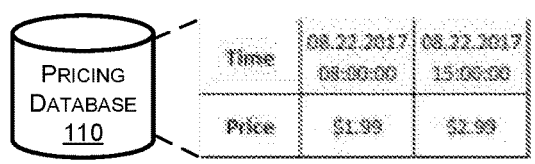
Figure 5A:
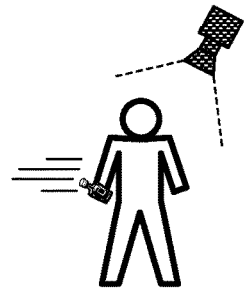
Figure 5B:
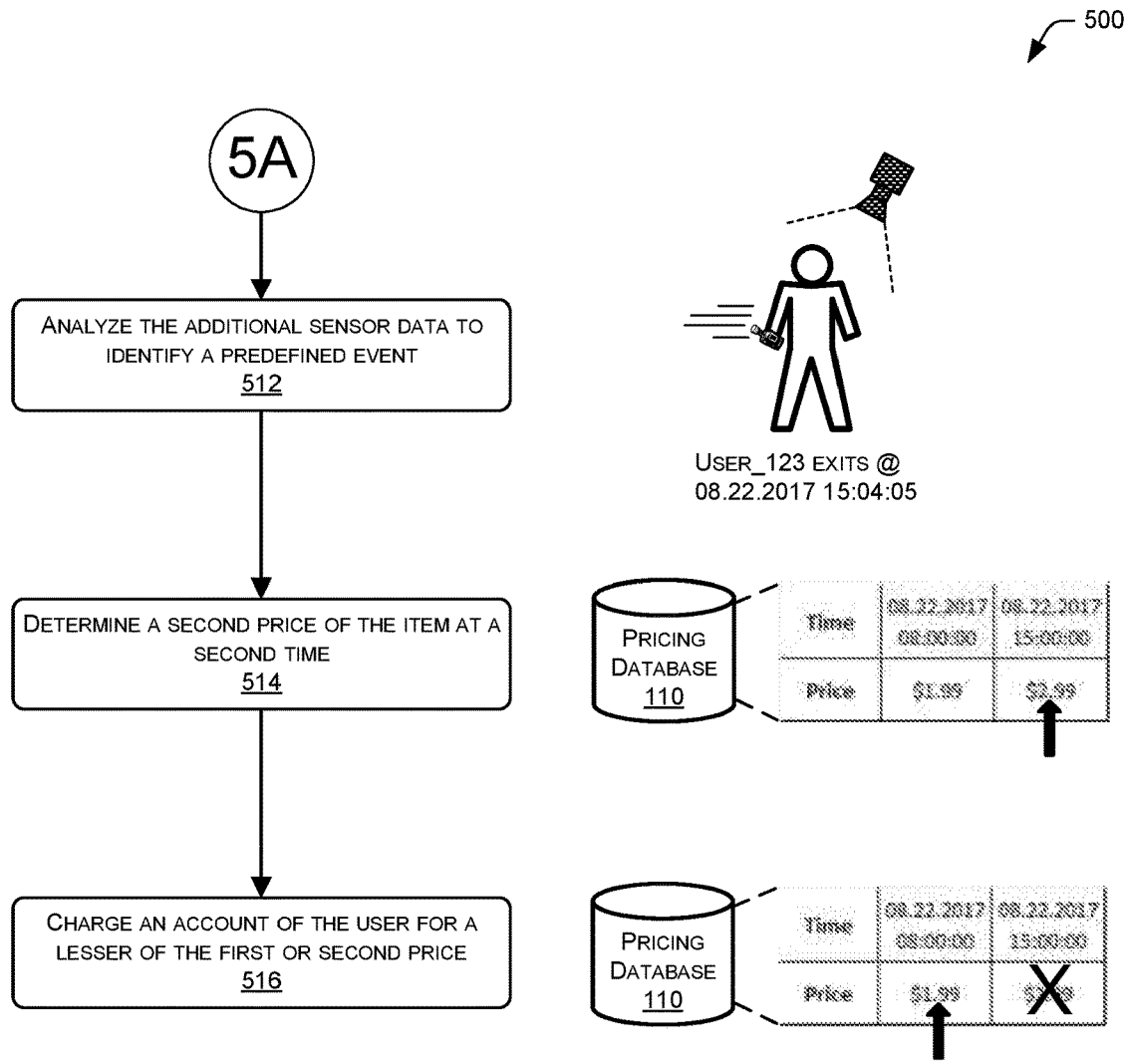
Figure 6:
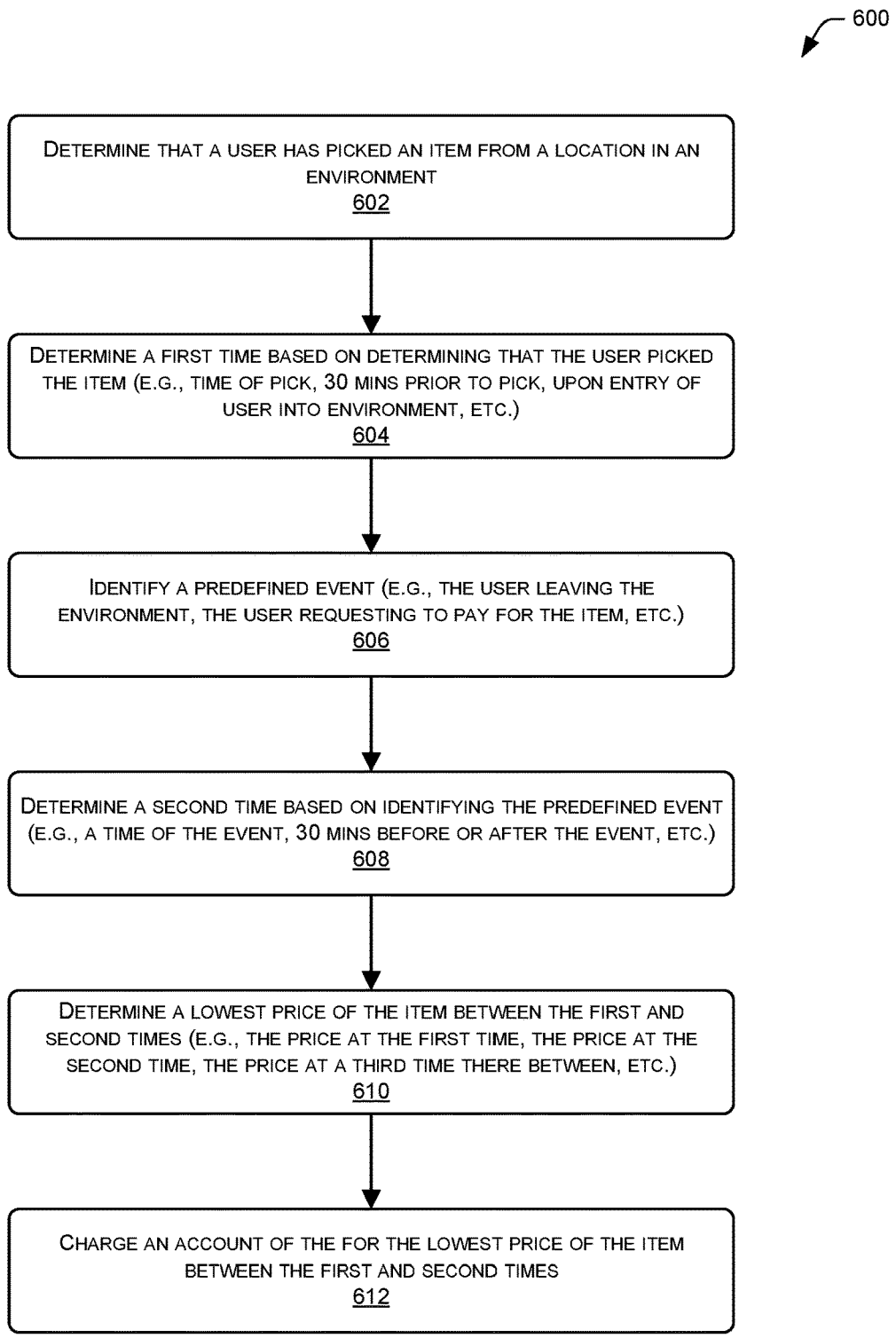
FIG. 6 illustrates a flow diagram of an example process for using sensor data to identify when a user picks an item and determining a price to charge the user for the item.

The item-pricing module 440, meanwhile, may function to select which of multiple prices for an item to use for different events. That is, when a user picks an item from an inventory location 214 of the facility 202 at a first time and pays for the item (e.g., via exiting the facility 202) at a second time, the item-pricing module 440 may determine a price to charge the user in the event that the price of the item changed during that time range (or during another defined time range). FIGS. 5A-5B and 6 describe operation of the item-pricing module 440 in greater detail below. Other modules 456 may also be present in the memory 410, while other data 458 may also be stored in the data store 418. For example, the other data 458 may comprise the cost of goods picked by the user 216, payment information, and so forth. Finally, as illustrated, the servers 304 may include one or more power supplies 460.

FIGS. 5A-B collectively illustrate a flow diagram of an example process 500 for using sensor data to determine when a user picks an item, a first price of the item when picked, an occurrence of a predefined event, and a second price of the item upon occurrence of the predefined event. The process 500 then determines which price is lesser and charges an account of the user for the lesser price. The process 500 may be performed, in whole or in part, by the inventory management system 416 (e.g., the item-pricing module 440) or other components described herein At 502, the process 500 receives sensor data from one or more sensors in an environment. For instance, the process 500 may receive sensor data from a weight sensor from a particular shelf in the environment, image data from a camera in the environment, image data from a mobile device of the user, or the like. At 504, the process 500 analyzes the sensor data to determine that a user has picked an item. That is, the process 500 may analyze the data to determine an identity of the item, an identity of the user, a time at which the user picked the item, and/or the like, using the techniques described above with references to the sensors and corresponding sensor data. In this example, the process 500 has determined that an example user ("user_123") picked an example item ("item_456") at a particular time (2:44 pm on Aug. 22, 2017).

At 506, the process 500 determines a first price of the item at a first time. The first time may comprise the time of the pick (2:44 pm on Aug. 22, 2017), a time that is a predefined amount of time prior to the pick (e.g., 30 minutes prior to 2:44 pm on Aug. 22, 2017), a time of entry of the user into the facility, or the like. In this example, the process 500 queries the pricing database 110 to determine that the price at the time of the pick was $1.99. As described above, the pricing database 110 may be configured to maintain authoritative prices of items in the facility 202, and may be updated dynamically. Therefore, prices of the items may be updated in the database 110 during user shopping experiences, potentially resulting in fluctuating prices during this time.

At 508, the process 500 receives an update in the price of the item and, in response, updates the pricing database 110 to represent the second price. That is, the database 110 is updated to indicate the new price ($2.99) and the time at which this new price was stored (3:00 pm on Aug. 22, 2017). It is noted, however, that the first price along with its timestamp also remains. That is, the pricing database 110 may maintain a history of item prices with timestamps at which the price began to take effect. In this example, the first price for the item was in effect between 8:00 am on Aug. 22, 2017 through 2:59:59 pm that same day, at which point the second price has taken effect. Of course, in the illustrated example, this price change has occurred after the user picked the item but prior to paying for the item or leaving the facility. It is noted that while this figure illustrates two prices for the item, it is to be appreciated that any other number of prices for any other amount of prior time may be stored in the pricing database 110.

At 510, the process 500 receives additional sensor data from one or more additional sensors in the environment. Again, this sensor data may comprise data from any of the sensors described above. In some instances, the additional sensor data comprises image data, captured by one or more cameras, representing the user exiting the environment. In other examples, the sensor data may be indicative of any other type of predefined event, which may trigger charging the user (i.e., a user account, payment instrument of the user, etc.) for a cost of any items acquired by the user during the shopping session, such as the item discussed in this process 500.

FIG. 5B continues the illustration of the process 500 and includes, at 512, analyzing the additional sensor data to identify a predefined event. The predefined event may include the user exiting the environment, the user requesting to purchase the item, a point-of-sale (POS) device of a merchant requesting to authorize payment by the user for the item, or the like. At 514, the process 500 determines a second time based on the identifying of the predefined event and determines a second price at this second time. The second time may comprise the time of the predefined event (e.g., the time at which the user exited the environment), an amount of time before or after the predefined event (e.g., 30 minutes after the user exited the environment), or the like. In this example, the second time corresponds to a time at which the user exited the environment, illustrated as 3:04 pm on Aug. 22, 2017. Therefore, FIG. 5B illustrates that the process 500 identifies the second price of this item at the second time as $2.99. That is, because the price of the item went up from $1.99 to $2.99 at 3:00 pm on Aug. 22, 2017, as illustrated by the pricing database 110, the price of the item at the second time (3:04 pm) is the new, higher price.

At 516, however, the process stores the lesser price of the item in association with a virtual shopping cart of the user and, potentially, charges an account of the user for the lesser of the first price or the second price. That is, because the user picked the item at a time that the price was less, the process 500 may honor that price by charging the user for the lower price. Further, if the price were to drop prior to the user exiting the store, the process 500 may offer this yet lower price. While this process 500 describes charging the user for the lower of the two prices, in some instances the process 500 may charge the user for a greater of a prices, an average or other blend of the prices, a lowest price between these two discrete times, or the like.

FIG. 6 illustrates a flow diagram of an example process 600 for using sensor data to identify when a user picks an item and determining a price to charge the user for the item. At 602, the process determines that a user has picked an item from a location in an environment. Again, the process 600 may utilize the techniques described above to acquire and analyze sensor data to identify the user, the item, the time, and the like. At 604, the process 600 determines a first time based on determining that the user picked the item. Again, this first time may correspond or otherwise be based on the pick.

At 606 the process 600 identifies a predefined event, such as the user exiting the environment, the user requesting to pay for the item, or the like. At 608, the process 608 determines a second time based on the identifying of the predefined event. The second time may correspond or otherwise be based on the time of the predefined event.

At 610, the process 600 determines a lowest price of the item between the first and second times. This may comprise the price of the item at the time of the pick, at the time of the predefined event, in the middle of these two events, or another time. At 612, the process 600 stores the lowest price of the item between the first and second times in association with a virtual shopping cart of the user and, potentially, charges an account of the user for this lowest cost. This may include charging a payment instrument stored in association with an account of the user for the item, as well as any other items acquired by the user during the shopping session.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
generating first sensor data using a first sensor in an environment associated with a merchant;
analyzing the first sensor data to determine that a user has entered the environment at a first time;
generating image data using one or more cameras residing in the environment, wherein the image data depicts the user in the environment physically picking up an item from an inventory location in the environment associated with the merchant;
analyzing the image data to identify the user;
analyzing the image data to identify the item physically picked up by the user from the inventory location in the environment;
generating second sensor data using a second sensor in the environment;
analyzing the second sensor data to determine that the user exited the environment at a second time;
at least partly in response to determining that the user exited the environment:
querying a pricing database to determine at least a first price of the item and a second price of the item between the first time and the second time;
determining, from at least the first price and the second price, a least price of the item between the first time and the second time; and
charging a payment instrument of the user for the least price of the item.

2. The method as recited in claim 1, wherein querying the pricing database comprises:
determining a price of the item at a time at which the user physically picked up the item.

3. The method as recited in claim 1, wherein querying the pricing database comprises:
determining a price of the item at a time corresponding to a request by the user to provide the payment instrument for the item or a predefined amount of time after the request.

4. The method as recited in claim 1, further comprising:
determining a third time at which the user physically picked up the item; and
determining a fourth time, wherein the fourth time precedes the third time by a predefined amount of time,
wherein querying the pricing database comprises:
determining a price of the item at the fourth time.

5. The method as recited in claim 1, wherein querying the pricing database comprises:
determining a price of the item at the second time.

6. The method as recited in claim 1, wherein at least one of the one or more cameras has a field-of-view that includes the inventory location.

7. The method as recited in claim 1, wherein querying the pricing database comprises:
querying the pricing database for each price of the item between the first time and the second time,
wherein the least price is a price of the item that is associated with a third time, and
wherein the third time is between the first time and the second time.

8. A system comprising:
one or more processors; and
one or more computer-readable media storing computer-executable instructions that, when executed on the one or more processors, cause the one or more processors to perform acts comprising:
receiving first sensor data generated using a first sensor in an environment associated with a merchant;
analyzing the first sensor data to determine that a user has entered the environment at a first time;
receiving image data generated using one or more cameras residing in the environment, wherein the image data depicts the user in the environment physically picking up an item from an inventory location in the environment;
analyzing the image data to identify the user;
analyzing the image data to identify the item physically picked up by the user from the inventory location in the environment;
generating second sensor data using a second sensor in the environment;
analyzing the second sensor data to determine that the user exited the environment at a second time;
at least partly in response to determining that the user exited the environment:
querying a pricing database to determine at least a first price of the item and a second price of the item between the first time and the second time;
determining, from at least the first price and the second price, a least price of the item between the first time and the second time; and
charging a payment instrument of the user for the least price of the item.

9. The system as recited in claim 8, wherein querying the pricing database comprises:
determining a price of the item at a time at which the user physically picked up the item.

10. The system as recited in claim 8, further comprising:
determining a third time at which the user physically picked up the item; and
determining a fourth time, wherein the fourth time precedes the third time by a predefined amount of time,
wherein querying the pricing database comprises:
determining a price of the item at the fourth time.

11. The system as recited in claim 8, wherein querying the pricing database comprises:
determining a price of the item at the second time.

12. One or more non-transitory computer-readable media storing computer-executable instructions that, when executed on one or more processors, cause the one or more processors to perform acts comprising:
- receiving first sensor data generated using a first sensor in an environment associated with a merchant;
- analyzing the first sensor data to determine that a user has entered the environment at a first time;
- receiving image data generated using one or more cameras in the environment, the image data representing the user in the environment physically picking up an item from an inventory location in the environment;
- analyzing the image data to identify the user;
- analyzing the image data to identify the item physically picked up by the user from the inventory location in the environment;
- generating second sensor data using a second sensor in the environment;
- analyzing the second sensor data to determine that the user exited the environment at a second time;
- at least partly in response to determining that the user exited the environment:
  - querying a pricing database to determine at least a first price of the item and a second price of the item between the first time and the second time;
  - determining, from at least the first price and the second price, a least price of the item between the first time and the second time; and
  - charging a payment instrument of the user for the least price of the item.

13. The system as recited in claim 8, wherein querying the pricing database comprises:
- determining a price of the item at a time corresponding to a request by the user to provide the payment instrument for the item or a predefined amount of time after the request.

14. The system as recited in claim 8, wherein at least one of the one or more cameras has a field-of-view that includes the inventory location.

15. The system as recited in claim 8, wherein querying the pricing database comprises:
- querying the pricing database for each price of the item between the first time and the second time,
- wherein the least price is a price of the item that is associated with a third time, and
- wherein the third time is between the first time and the second time.

16. The one or more non-transitory computer-readable media as recited in claim 12, wherein querying the pricing database comprises:
- determining a price of the item at a time at which the user physically picked up the item.

17. The one or more non-transitory computer-readable media as recited in claim 12, wherein querying the pricing database comprises:
- determining a price of the item at a time corresponding to a request by the user to provide the payment instrument for the item or a predefined amount of time after the request.

18. The one or more non-transitory computer-readable media as recited in claim 12, wherein the acts further comprise:
- determining a third time at which the user physically picked up the item; and
- determining a fourth time, wherein the fourth time precedes the third time by a predefined amount of time,
- wherein querying the pricing database comprises:
- determining a price of the item at the fourth time.

19. The one or more non-transitory computer-readable media as recited in claim 12, wherein querying the pricing database comprises:
- determining a price of the item at the second time.

20. The one or more non-transitory computer-readable media as recited in claim 12, wherein querying the pricing database comprises:
- querying the pricing database for each price of the item between the first time and the second time,
- wherein the least price is a price of the item that is associated with a third time, and
- wherein the third time is between the first time and the second time.

* * * * *